Patented Dec. 26, 1950

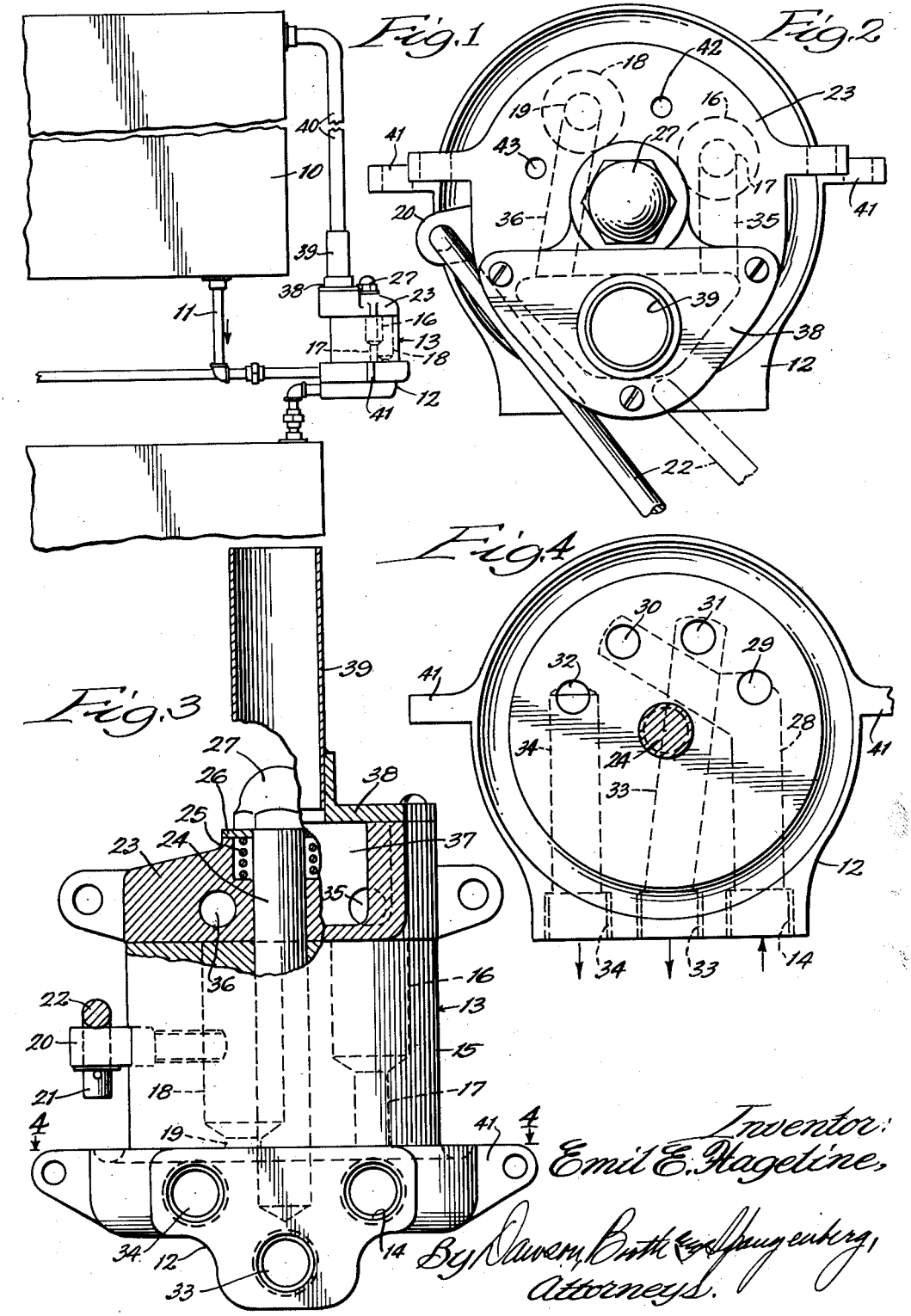

2,535,204

UNITED STATES PATENT OFFICE 2,535,204

MEASURED LIQUID FEED

Emil E. Hageline, Chicago, Ill., assignor to The Lathrop-Paulson Company, Chicago, Ill., a corporation of Illinois Application May 13, 1947, Serial No. 747,871

7 Claims. (Cl. 222—277)

This invention relates to a measured liquid feed and to apparatus for intermittently supplying a measured quantity of liquid.

In the washing of milk cans and other cans by machines, it is common practice to supply a special washing fluid, known generally as an "acid cleaner," to the machine at various points. For example, a measured quantity of the material is supplied to the interior of a can in conjunction with steam shortly after the can enters the machine. Again, a measured quantity of the acid is discharged into a rinse receptacle where it is mixed with water and the solution applied in the later rinsing step. The apparatus is so designed that a measured quantity of the liquid is supplied only when a can is in position for treatment. In the supply of such liquid, a valve has been actuated to allow the liquid to flow from a container into a measuring vessel, and later the measuring vessel is emptied. Such apparatus is efficient when the liquid level in the supply tank is at a certain level or levels, but becomes inefficient when the level in the tank varies widely. In other words, the pressure or head provided by the liquid body in the container affects the amount of liquid that enters the measuring vessel, and thus a variation in such head produces a variation in the quantity of liquid fed at each feeding interval. Similar inequalities in the quantity of liquid fed have been found in milk samplers and in many other measuring devices.

An object of the present invention is to provide mechanism for overcoming the above defects and for feeding an exact quantity of liquid at each feeding interval irrespective of the liquid level in the supply tank. A further object is to provide new and efficient mechanism for quickly filling measuring containers and discharging the same with a minimum of mechanical movement and with complete accuracy in the quantity of liquid fed. Yet another object is to provide measuring mechanism in combination with a supply tank whereby a column of liquid completely filling each measuring vessel or chamber is maintained and whereby a complete emptying of the chambers is brought about at selected intervals to isolate that portion of the column of liquid within the chambers only and to divert it to the desired conduit. Other specific objects and advantages will appear as the specification proceeds.

The invention is illustrated, in a single embodiment, by the accompanying drawing, in which—

Figure 1 is a broken side view in elevation of apparatus embodying my invention; Fig. 2, a top plan view of the measuring apparatus; Fig. 3, an enlarged side view in elevation of the measuring structure with a portion thereof broken away and shown in section; and Fig. 4, a top plan view of the lower closure member employed with the measuring device.

In the illustration given, 10 designates a supply tank which is preferably supported in the can washing machine or other apparatus at a higher level. The tank 10 may contain a concentrated washing material or any other suitable liquid. A conduit 11 leads from the tank 10 and enters the bottom closure or base 12 of a measuring device 13. The pipe 11 communicates with the inlet 14 of the base or closure member 12.

The base member 12 is provided with a recessed bottom portion adapted to receive the rotatable cylinder 15. The cylinder 15 is provided with a small measuring chamber 16 having an inlet portion 17, and also with a larger measuring chamber 18 provided with an inlet portion 19. Secured to the member 15 to rotate the same is an arm 20 which is perforated to receive the downwardly-turned end 21 of the actuating arm 22.

The upper end of the rotatable cylinder 15 is closed by a top closure member 23. A threaded bolt 24 extends through the closure member 23 and the rotatable cylinder 15, and threadedly engages the lower closure member 12, as shown more clearly in Fig. 3. A spring 25 is housed within a recess in the upper portion of the member 23 and normally urges the member 23 downwardly toward the cylinder 15. The upper end of the spring 25 engages a washer 26 which is held in position by a threaded cap 27 engaging the upper threaded end of bolt 24.

The liquid entering the inlet 14 of the lower closure member 12 passes through the conduit 28 to an inlet 29 aligned with the inlet 17 of cylinder 15. The passage 28 also extends laterally to the inlet 30 which is aligned with the inlet 19 of the chamber 18 of cylinder 15. Thus, when the cylinder 15 is in a position in which the opening 17 is aligned with port 29 and in which the inlet 19 is aligned with the port 30, liquid will flow through the passage 28 into each of the chambers.

The lower closure member is also provided with outlet passages. When the cylinder 15 is moved laterally, it brings the inlet 17 into alignment with an outlet port 31 and the opening 19 into alignment with the outlet port 32. An outlet passage 33 leads away from the port 31, as shown more clearly in Fig. 4, and an outlet passage 34 leads away from the port 32. In actual operations, the passage 33 from the smaller measuring chamber 16 leads the acid cleaner to a charging tank for the rinsing station. In this tank, the acid cleaner is mixed with water, and this water is used in the rinsing step. The larger quantity of acid cleaner from the outlet passage 34 is conveyed to a steam line where it is injected into a can by means of the steam early in the washing operation. Thus, a measured quantity of acid cleaner is supplied for each can. For example, 12 cc. of the acid cleaner are discharged through line 34 and, by means of steam, are discharged into the interior of a can. Also, for each can fed into the machine, 8 cc. of the acid cleaner may be discharged through outlet 33 into the charging tank for the rinsing step.

If the upper ends of the chambers 16 and 18 were closed, the trapped air therein would prevent the rise of liquid into the chambers. To cause a column of water to rise quickly within the chambers 16 and 18, I provide the top closure 23 with laterally-extending passages 35 and 36. Passages 35 lead to a well 37 within the member 23, the top of the well being closed by a plate 38. The plate 38 is apertured to tightly receive a vent pipe or riser 39. I prefer to connect the riser 39 by means of pipe 40 with the upper end of the supply tank 10, as shown more clearly in Fig. 1.

The closure member 12 is provided with flanges 41 by which it may be attached to the machine. It will be understood that any supporting means may be used. Any means for actuating the cylinder 15 so as to swing it from the two positions shown may be employed. In the illustration given, a rod 22 is shown. It will be understood that this rod may be connected to any reciprocating part of the machine. For example, the rod may be connected to reciprocating mechanism of the type described in my U. S. Patent No. 2,364,971 which issued December 12, 1944.

While I have described the apparatus as machine-operated, it will be understood that for use as a sampler or for other mechanism, the cylinder 15 may be rotated by hand to the stations indicated.

In order to enable the liquid to flow quickly from the chambers 16 and 18, I provide an air port 42 through the closure 23 and above the chamber 16 when it is in draining position, and a similar port 43 over chamber 18 when it is in draining position above the outlet port 32.

*Operation*

In the operation of the apparatus, assuming that the cylinder 15 has been moved to the intake position in which the ports 17 and 19 are aligned with the inlet ports 29 and 30 respectively, liquid flows from the container 10 through conduit 11, inlet 14, passage 28, and ports 29 and 30 into the chambers 16 and 18. Since the container 10 is at a higher level, the liquid column will rise through the chambers 16 and 18 and pass outwardly through the conduits 35 and 36 into the well 37 and thence upwardly through pipes 39 and 40 to the level of the liquid within the container 10. When the cylinder 15 is rotated to its other position by movement of the reciprocating rod 22, the communication between ports 17 and 29 and 19 and 30 is broken and, instead, the port 17 becomes aligned with the outlet port 31, and the port 19 becomes aligned with the outlet port 32. At the same time, the upper portions of the chambers, which no longer communicate with passages 35 and 36, are now in communication with the air vents 42 and 43. The liquid in the chambers therefore flows quickly through outlet passages 33 and 34 to outlet conduits. The rod 22 then returns the cylinder 15 to the initial position heretofore described and the operation is repeated.

It will be observed that in the foregoing operation, the apparatus in effect maintains a U-shaped column of liquid which is constantly maintained, and that the metering mechanism in effect cuts out a selected segment of the column for the feeding operation. Extremely quick results are obtained because after each feeding operation, there is liquid in each side of the metering cylinder 15, and a minimum of flow is necessary for filling the chambers. There is no opportunity for the chambers to fail to be supplied because liquid may enter the same from both ends.

The invention has been described specifically in connection with the feeding of a concentrated cleaner material for use in can washing machines. It will be understood that this is merely one use to which the apparatus may be put, and the purpose herein in using the one embodiment is to employ it merely as an illustration of the operation of the invention.

The apparatus has been described in connection with a pair of chambers, one of which is larger than the other. It will be understood that the invention is useful with but a single chamber as well as with a variety of chambers of varying capacities. It will be understood that any suitable material may be used in the construction of the measuring or metering device. If desired, the cylindrical body 15 may be formed of a transparent plastic material, such as Lucite, and the members 12 and 23 may be formed of stainless steel. A large variety of materials may obviously be used for the construction of such parts. The transparent cylinder 15 enables the operator to observe the filling and emptying of the chambers and to verify their complete emptying and filling during the operative strokes.

While in the foregoing specification, I have set forth a single embodiment in substantial detail for the purpose of illustrating the invention, it will be understood that the details of such structure may be modified widely by those skilled in the art without departing from the spirit of my invention.

I claim:

1. In apparatus for intermittently supplying a measured quantity of liquid, a supply container of the liquid supported at one level, a measuring device supported at a lower level, said device comprising fixed end closure members and a rotatably-mounted body therebetween providing at least one chamber on one side, an actuating arm connected to said body between said closure members, a conduit from said container to the lower end closure, a conduit extending upwardly from said upper closure, and ports in said closures establishing communication between said conduits and chamber when the rotatably-mounted body is moved to one position, said lower closure having a discharge port communicating with said chamber when the body is rotated to a second position and out of contact with said conduits.

2. In apparatus for intermittently supplying a measured quantity of liquid, a supply container of the liquid supported at one level, a measuring device supported at a lower level, said device comprising end closure members and a rotatably-mounted body therebetween providing at least one chamber on one side, a conduit from said container to the lower end closure, a conduit extending upwardly from said upper closure, ports in said closures establishing communication between said conduits and chamber when the rotatably-mounted body is moved to one position, said lower closure having also a discharge port communicating with said chamber when the body is rotated to a second position, and means engaging said body at a point between said end enclosure for intermittently rotating said body between said positions.

3. In apparatus for intermittently supplying a measured quantity of liquid, a supply container of the liquid supported at one level, a measuring device having a plurality of chambers of different capacities supported at a lower level, a conduit leading from said container to said chambers, a conduit leading from said chambers upwardly therefrom to receive liquid rising above the chambers, means for closing said conduits to isolate said chambers, means for draining said chambers while isolated from said conduits, and means for restoring communication between said chambers and conduits.

4. In apparatus for intermittently supplying measured quantities of liquid to separate discharge conduits, a supply container of the liquid supported at one level, a measuring device supported at a lower level, said device comprising end closure members, and a rotatably-mounted body therebetween providing a plurality of spaced chambers, a conduit from said container to the lower end closure, a conduit extending upwardly from said upper closure, ports in said closures establishing communication between said conduits and chambers when the rotatably-mounted body is moved to one position, said lower closure being provided with spaced discharge ports communicating each with one of said chambers when the body is rotated to a second position, and means engaging the exterior of said body between said end closures for rotating said body.

5. In apparatus for intermittently supplying a measured quantity of liquid, a supply container of the liquid supported at one level, a measuring device supported at a lower level, said device comprising end closure members, at least one of which is fixed, a cylindrical member rotatably supported between said closure members, said cylindrical member being provided with a plurality of chambers therein, a conduit from said container to the lower end closure, said upper closure having a well therein, a conduit communicating with said well and extending upwardly adjacent said container, ports in said lower closure establishing communication between said conduit and chambers when the rotatable body is moved to one position, passages in said upper closure establishing communication between said chambers and said well when said cylinder is moved to said position, said lower closure having discharge ports communicating each with one of said chambers when said cylinder is rotated to a second position and said upper closure having air vents communicating with said chambers when the same are in said second position.

6. In apparatus for intermittently supplying a measured quantity of liquid, a supply container of the liquid supported at one level, a measuring device supported at a lower level, said measuring device comprising end closure members and a rotatably-mounted cylinder therebetween, means secured to the exterior of said body for rotating the same independently of the end closures, spring means urging said parts together, said cylinder providing at least one chamber on one side and being formed of transparent material, a conduit from said container to the lower end closure, a conduit extending upwardly from said upper closure, and ports in said closures establishing communication between said conduits and chamber when said cylinder is moved to one position, said lower closure having a discharge passage communicating with said chamber when said cylinder is rotated to a second position.

7. A liquid metering device comprising upper and lower closure members, a rotatably-mounted member held between said closure members, a bolt securing said closures and rotatably-mounted member together, means secured to the exterior of said rotatably-mounted member for rotating said rotatably-mounted member, said rotatably-mounted member being provided with a measuring chamber, said lower closure having an inlet passage communicating with said chamber when the body is in one position and an outlet passage communicating with said chamber when the body is in a second position, said upper closure member being provided with a vent passage, and a riser communicating with said vents, said upper closure being also provided with an air vent adapted to communicate with said chamber when the same is in said second position.

EMIL E. HAGELINE.

REFERENCES CITED

The following references are of record in the file of this patent:

UNITED STATES PATENTS

| Number | Name | Date |
| --- | --- | --- |
| 249,134 | Williams | Nov. 1, 1881 |
| 394,391 | Perkins | Dec. 11, 1888 |
| 1,825,200 | Patterson | Sept. 29, 1931 |